US011971785B2

(12) United States Patent
Rath et al.

(10) Patent No.: US 11,971,785 B2
(45) Date of Patent: Apr. 30, 2024

(54) EFFICIENT CLEANUP/DEFRAGMENTATION MECHANISM FOR EXPIRED RETENTION LOCKED (COMPLIANCE AND GOVERNANCE) SEGMENTS IN DEDUPED CLOUD OBJECTS

(71) Applicant: EMC IP Holding Company LLC, Hopkinton, MA (US)

(72) Inventors: Jagannathdas Rath, Karnataka (IN); Kalyan C. Gunda, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 82 days.

(21) Appl. No.: 17/071,529

(22) Filed: Oct. 15, 2020

(65) Prior Publication Data

US 2022/0121529 A1 Apr. 21, 2022

(51) Int. Cl.
*G06F 16/00* (2019.01)
*G06F 3/06* (2006.01)
*G06F 11/14* (2006.01)
*G06F 16/174* (2019.01)

(52) U.S. Cl.
CPC ........ *G06F 11/1453* (2013.01); *G06F 3/0619* (2013.01); *G06F 3/0641* (2013.01); *G06F 3/0656* (2013.01); *G06F 3/067* (2013.01); *G06F 11/1435* (2013.01); *G06F 11/1464* (2013.01); *G06F 11/1469* (2013.01); *G06F 16/174* (2019.01)

(58) Field of Classification Search
None
See application file for complete search history.

(56) References Cited

U.S. PATENT DOCUMENTS

| 9,503,542 | B1* | 11/2016 | Wang | H04L 67/2842 |
|---|---|---|---|---|
| 9,727,470 | B1* | 8/2017 | Cande | G06F 3/067 |
| 9,959,280 | B1* | 5/2018 | Whitehead | G06F 16/13 |
| 2020/0310964 | A1 | 10/2020 | Lu et al. | |
| 2022/0083514 | A1* | 3/2022 | Rath | G06F 11/1451 |
| 2022/0091763 | A1* | 3/2022 | Perneti | G06F 3/0653 |

OTHER PUBLICATIONS

Ding, Peng "A Live Stream processing Method, Device And System, Computer Readable Storage Medium", 11 pages, (CN-113709412-A) (Year: 2020).*
European Search Report received for EP Patent Application No. 21201825.3, dated Jun. 8, 2022, 11 pages.
Vrable et al., "Cumulus: Filesystem Backup to the Cloud", USENIX, USENIX, the Advanced Computing Systems Association, Feb. 2, 2009, pp. 1-14, XP061008779.
Wang et al., "WOLF—Novel Reordering Write Buffer to Boost the Performance of Log-Structured File Systems", Proceedings of the FAST 2002 Conference on File and Storage Technologies Monterey, Jan. 30, 2002, pp. 1-16, XP055925634.

* cited by examiner

*Primary Examiner* — Bai D Vu
(74) *Attorney, Agent, or Firm* — Workman Nydegger

(57) ABSTRACT

One example method includes identifying a cloud object as a potential candidate for defragmentation, evaluating the cloud object to determine what portion of segments of the cloud object are expired, when the portion of expired segments meets or exceeds a threshold, segregating the expired segments and unexpired segments of the cloud object, creating a first new cloud object that includes only unexpired segments, creating a second new cloud object that includes only expired segments, and deleting the cloud object from storage.

20 Claims, 9 Drawing Sheets

Fragmented Cloud objects with expired segments

| Locked for: 1yr | Locked for: 6m | Locked for: 1yr | Locked for: 2yr | Locked for: 1.5yr |
|---|---|---|---|---|
| A1: 6m | B1: 8m | *C1: 2yr* | D1: 1yr | E1: 3m |
| *A2: 9m* | B2: 3yr | *C2: 2yr* | *D2: 2yr* | E2: 5m |
| A3: 2yr | *B3: 1.5y* | C3: 3yr | D3: 3yr | *E3: 1yr* |
| A4: 1yr | B4: 6m | *C4: 1yr* | *D4: 3yr* | E4: 1.5yr |
| *A5: 1.3yr* | B5: 9m | C5: 1yr | D5: 2yr | E5: 5yr |
| A6: 3m | B6: 2.2yr | *C6: 6m* | *D6: 2yr* | E6: 3yr |
| A7: 1.9yr | B7: 1.7yr | C7: 6m | D7: 5yr | *E7: 3yr* |
| *A8: 2.2yr* | *B8: 5yr* | C8: 5yr | D8: 1yr | E8: 2m |
| A9: 5.2yr | B9: 1yr | C9: 5yr | *D9: 5yr* | *E9: 4m* |
| *A10: 5yr* | *B10: 2yr* | *C10: 5yr* | D10: 2yr | E10: 2m |
| A11: 2.4yr | B11: 1.5yr | | D11: 2yr | E11: 1.5yr |
| | | | | *E12: 2yr* |

The segments in *Bold* are expired segments

**New defragmented and zoned objects for RLG
-Locked for the maximum duration among all segments** — 550

Zone: 0-6m
*Locked for: 5m*

| A6: 3m |
| E1: 3m |
| *E2: 5m* |
| E8: 2m |
| E10: 2m |

Zone: 6m-1yr
*Locked for: 9m*

| A1: 6m |
| B1: 8m |
| B4: 6m |
| *B5: 9m* |
| C7: 6m |

Zone: 1yr-1.5yr
*Locked for: 1yr*

| *A4: 1yr* |
| B9: 1yr |
| C5: 1yr |
| D1: 1yr |
| D8: 1yr |

Zone: 1.5yr-2yr
*Locked for: 1.9yr*

| *A7: 1.9yr* |
| B7: 1.7yr |
| B11: 1.5yr |
| E4: 1.5yr |
| E11: 1.5yr |

Zone: 2yr-2.5yr
*Locked for: 2.4yr*

| A3: 2yr |
| B6: 2.2yr |
| D5: 2yr |
| *A11: 2.4yr* |
| D10: 2yr |
| D11: 2yr |

552

Zone: 3yr-3.5yr
*Locked for: 3yr*

| *B2: 3yr* |
| C3: 3yr |
| D3: 3yr |
| E6: 3yr |

Zone: 5yr-5.5yr
*Locked for: 5.2yr*

| *A9: 5.2yr* |
| C8: 5yr |
| C9: 5yr |
| D7: 5yr |
| E5: 5yr |

*Expired Segments
Not locked*

| A2: 9m |
| A5: 1.3yr |
| A8: 2.2yr |
| A10: 5yr |
| B3: 1.5y |
| B8: 5yr |
| B10: 2yr |
| C1: 2yr |
| C2: 2yr |
| C4: 1yr |

*Expired Segments
Not locked*

| C6: 6m |
| C10: 5yr |
| D2: 2yr |
| D4: 3yr |
| D6: 2yr |
| D9: 5yr |
| E3: 1yr |
| E7: 3yr |
| E9: 4m |
| E12: 2yr |

EFFICIENT CLEANUP/DEFRAGMENTATION MECHANISM FOR EXPIRED RETENTION LOCKED (COMPLIANCE AND GOVERNANCE) SEGMENTS IN DEDUPED CLOUD OBJECTS

FIELD OF THE INVENTION

Embodiments of the present invention generally relate to cleanup and defragmentation of deduped and retention locked data. More particularly, at least some embodiments of the invention relate to systems, hardware, software, computer-readable media, and methods for cleanup and defragmentation of expired retention locked segments in storage environments including cloud storage.

BACKGROUND

Many enterprises use dedupe applications for backup and archival. These dedupe applications allow retention locking of the backup files, on-prem, for protection and/or compliance. Also they allow the backup files to be moved to cloud storage, or cloud space, environment for long term retention. The dedupe applications may also provide retention lock protection for these moved dedupe objects in the cloud storage as well, where the objects are locked using the cloud providers retention lock APIs for certain durations. It should be noted that these deduped cloud objects contain group of data segments shared by one or many backup files. Over time, with numerous lock, revert and delete operations, the cloud space will get fragmented with deduped objects containing a mix of RL (retention lock) expired segments, and RL active segments. Such objects cannot be deleted or cleaned up by a garbage collector or cleanup process as they still contain one or more RL active segments, shared by one or more locked files and are therefore still locked in the cloud and cannot be deleted.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3a discloses an example segment distribution across newly created objects after the defrag process and their RLG lock durations.

DETAILED DESCRIPTION OF SOME EXAMPLE EMBODIMENTS

Figure 1:
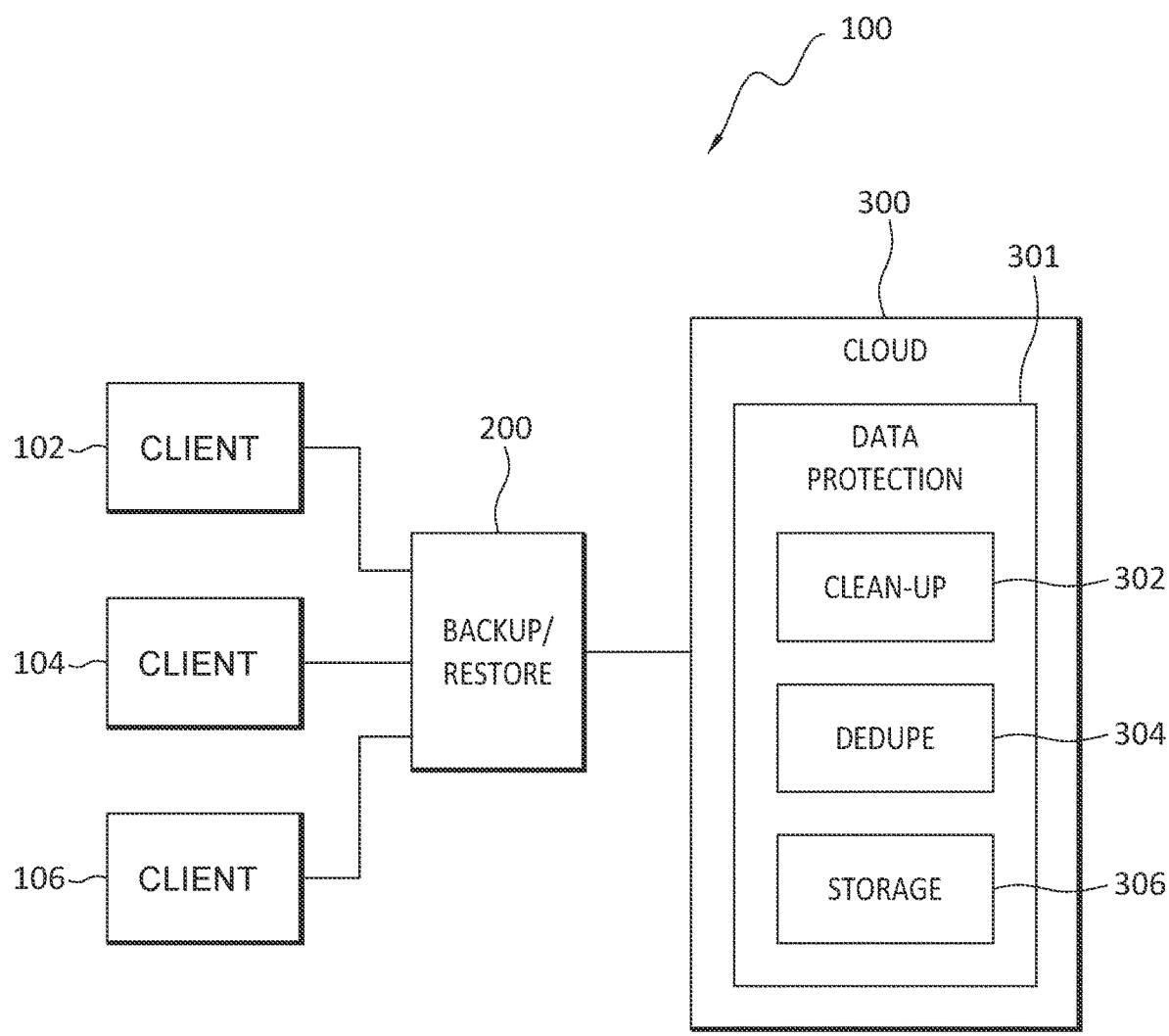
FIG. 1 discloses aspects of an example operating environment.

Embodiments of the present invention generally relate to cleanup and defragmentation of deduplicated, or 'deduped,' data. More particularly, at least some embodiments of the invention relate to systems, hardware, software, computer-readable media, and methods for cleanup and defragmentation of expired retention locked segments in storage environments such as cloud storage for example.

In one example embodiment, defragmentation of deduped objects is performed based on retention time of a file and, hence, the segments of the file, so that the whole object expires rather than resulting in fragmentation of live vs expired segments in an object. Such embodiments may be implemented in connection with one, or both, of RLG (retention-locked, governance) and RLC (retention-locked, compliance) objects.

In more detail, example embodiments may selectively process fragmented deduped objects in the cloud, that is, objects that contain a mix of both RL expired segments and RL active segments. These objects may be defragmented by separating their constituent segments into different objects, based on various criteria specific to retention locking (RL). Such criteria may include, for example, the lock status of the object, the minimum/maximum retention period of all files that a segment corresponds to, and the type of lock implemented on the object. As to the latter criterion, at least two different locks may be employed in example embodiments, namely, RLC and RLG. Notably, an RLC lock cannot be reverted or undone once it has been set.

After the objects have been defragmented, new defragmented and zoned objects may be created, and the duration, or retention time, of the new objects may be determined based upon the type of locking employed for the object. Any expired segments from the defragmented objects may be combined to form an expired, unlocked, object which may then be deleted later by GC, thereby freeing storage space previously occupied by the expired segments.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that cleanup/fragmentation may be performed on objects that include a mix of expired segments and live segments. In an embodiment, a method may be employed that performs defragmentation of deduped objects, based on the retention time of the files referencing the dedupe segments in the object, so that the entire object will expire at the same time. In an embodiment, objects are processed according to either, or both, of RLC locks and RLG locks.

A. OVERVIEW

Data deduplication systems, or 'dedupe' systems that extend the retention lock capabilities from on-prem to cloud, may protect the data both ways, that is, while the data is on-premises at the enterprise and while the data is off-premises, such as in a cloud storage environment. In this way, the data may be protected both on the filesystem (FS) side and on the cloud side. Such systems may provide a retention capability for data that is deduped between files with RLG (governance) & RLC (compliance) levels. Particularly, such systems may provide the retention capability by efficiently locking the cloud objects using the cloud provider APIs (application program interfaces) and intelligently managing the deduped segments within an object using different levels of retention times for the segments.

It is noted that an efficient dedupe systems may not store segments directly on-premises or in the cloud, but may instead pack a group of one or more segments inside container objects. There may be various rationale(s) supporting this approach. For example, the segment size, such as about 2K-12K for example, employed in some dedupe may systems directly impact the overall dedupe ratio of the system. As another example, a relatively smaller segment size may increase TCO (total cost of ownership, for storage) due to the need for more transactions in managing numerous such small objects, as compared to the relatively fewer transactions that would be needed to process packed container objects which may include multiple segments. As a final example of an underlying rationale for the use of packed container objects, the use of segment-level processing and transaction may result in the generation and processing of relatively more metadata that would need to be managed in the cloud, which may lead to problems in a cloud backend such as slower object lookups for example, whereas a single container object containing multiple segments may require less in terms of metadata generation and processing.

Eventually, cloud segments may get expired, due to deletion of files or objects that include those segments, either after the lock expires or the lock is reverted, or the file is recalled back to on-premises. However, typical garbage collectors and garbage collection processes are unable to delete cloud objects that contain a mix of active, or live, segments, and non-active, or expired, segments, as the object would still be in a locked state because of the presence of live segments. As such, the number of objects with such a segment mix may increase over time, thus increasing the storage cost of the cloud to the owner of the data, due to the space unnecessarily occupied by the expired segments within the locked objects.

This problem associated with objects containing both expired segments and non-expired segments may occur with, and without, RL lock. The typical approach to this circumstance has been to simply wait for all segments in the object to expire. However, because objects with a mix of live and expired segments may be retained a relatively longer time with this approach, the TCO increases since more storage is needed, and for a longer period of time.

Thus, example embodiments of the invention may embrace, among other things, approaches that may implement defragmentation of objects based on retention time of the files and, hence, the retention time of the constituent segments of the files, so that the whole object expires. That is, all the segments of the object expire at the same time, avoiding a situation involving the fragmentation of live, versus expired, segments in an object.

B. ASPECTS OF AN EXAMPLE ARCHITECTURE AND ENVIRONMENT

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, cleanup and defragmentation operations, which may collectively also be referred to as garbage collection operations. More generally, the scope of the invention embraces any operating environment in which the disclosed concepts may be useful.

Embodiments of the invention may be employed in connection with cloud storage environments and/or cloud computing environments. Example cloud storage environments include a data protection environment that may take the form of a public or private cloud storage environment, an on-premises storage environment, and hybrid storage environments that include public and private elements. Any of these storage environments may store new and/or modified data collected and/or generated, for example, by one or more clients in an enterprise, or other, setting.

As well, any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include cloud environments in which processing, data protection, and/or other, services may be performed on behalf of one or more clients. Some example cloud computing environments in connection with which embodiments of the invention may be employed include, but are not limited to, DellEMC Data Domain, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment, including a cloud storage and/or cloud computing environment, may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 1, one example of an operating environment for embodiments of the invention is denoted generally at 100. In general, the operating environment 100 may include any number 'n' of clients 102, 104, and 106, each of which may include one or more applications that generate new/modified data. Data generated by the clients 102, 104, and 106, may be backed up, such as by a backup/restore server 200 for example, to a storage site, such as a cloud storage site 300 for example.

The cloud storage site 300 may include a data protection system 301 that may comprise a cleanup platform 302 whose operation may be triggered from the data protection system 301, a deduplication system 304 which may run on-premises at an enterprise datacenter or in the cloud storage site 300 as shown, and storage 306. While any of the various cleanup, defragmentation, and garbage collection, processes and functions disclosed herein may be implemented by the cleanup platform 302, the scope of the invention is not limited to this particular implementation. In some embodiments, the cleanup platform 302 may be an element of the deduplication system 304, although that is not required. Such processes and functions may be provided as a service, such as to an enterprise that includes the clients 102, 104, and 106. These processes and functions may be initialized by, for example, the cloud storage site 300, the backup/restore server 200, and/or, one or more of the clients 102, 104, 106. In some embodiments, any of the cleanup, defragmentation, and garbage collection, processes and functions disclosed herein may be initialized automatically by the dedupe system 304 and/or the data protection system 301 without requiring initialization by a client, or by any other entity. Such processes may be scheduled, or performed on-demand. Further, in at least some embodiments, objects and segments processed by the cleanup platform 302 may have been deduplicated, such as by the cloud storage site 300, clients 102/104/106, and/or, the backup/restore server 200, prior to processing by the cleanup platform 302.

It will be apparent that various modifications may be made to the example operating environment 100 of FIG. 1. For example, the deduplication system 304 may operate entirely in the cloud storage site 300, as a cloud machine instance/VM. In this example configuration then, both the data protection system 301 and deduplication system 304 may both operate in the cloud storage site 300. Alternatively, the data protection system 301 may operate locally, that is, on-premises at an enterprise datacenter. More generally however, no particular configuration, or location, of a data protection system or deduplication system is required.

In terms of some of the operations of the example operating environment 100, the backup server 200 may the client 102/104/106 data to the data protection system 301, which will dedupe the data, using the deduplication system 304, and then write the deduplicated objects on disk. Subsequently, the deduplicated objects may be moved to the cloud storage for long term retention. Further, the operation of the cleanup platform 302 may be part of, and triggered from, the data protection system 301. At this point, the cloud storage site 300 may only be responsible for storing the deduplicated objects, such as in the storage 306, for the long term.

C. FURTHER ASPECTS OF SOME EXAMPLE EMBODIMENTS

C.1. Some General Aspects

As noted earlier, example embodiments of the invention embrace an efficient defragmentation/cleanup mechanism for expired retention locked (RL) segments in environments such as a cloud site for example. This mechanism or method may selectively process the fragmented objects in the cloud, that is, any objects containing a mix of RL expired segments and RL active segments, and defragment those objects by separating their segments into different objects, based on various criteria specific to retention locking. An object that includes a mix of RL expired segments and RL active segments may be referred to herein as a 'fragmented object.'

In more detail, and with particular reference to RLG, an example method may detect all fragmented RLG objects that include a certain amount of expired segments, retrieve the active and expired segments of such objects, and then segregate those segments into new container objects based on factors such as, but not limited to, the respective expiry durations and respective lock status of those segments. In some embodiments at least, only the new objects with RL active segments will eventually be locked for the maximum duration, that is, according to the longest duration or retention value of any of its segments, using the APIs of a cloud provider. Eventually, the retention lock on all the selected fragmented objects may be reverted and those selected fragmented objects deleted. A garbage collection (GC) process, or other cleanup process, may now be able to examine the newly created, non-locked objects with expired segments and possibly delete those objects to reclaim cloud space. This may be done after the garbage collection process has performed one or more regular liveness checks to identify unexpired objects that should be retained.

With reference now to an RLC scenario, embodiments of the invention may employ another method for the handling of compliance locked objects (RLC), since the RLC locks on those objects cannot be reverted, even by the cloud administrator. In more detail, an example method for handling RLC objects may employ a controlled locking mechanism. Particularly, the objects may be locked for the minimal duration among all its segments, that is, the lock time may be set at the lowest lock time value of any of the segments that make up the object. In this way, the compliance locks may expire at the least possible duration, rather than at the maximum duration as in the case of RLG objects, and thereby provide early opportunities for cleanups.

During GC runs, a similar approach of segregation and grouping based on lock status and expiry duration may be employed as used in embodiments involving RLG objects, where one difference between the RLC approach and the RLG approach may be that, in the RLC approach, the newly created objects containing grouped active segments would be RLC locked for the minimum duration, rather than for the maximum duration as in the case of the RLG approach. Whether the RLC or RLG process was employed in a particular situation or circumstance, indexes, such as FP (finger print) indexes for example, and local segment and/or object metadata, may be updated, after processing of the objects and/or segments, to point to any new container objects that were created by the process.

Figure 2:
FIG. 2 discloses aspects of some example cloud objects and their segments with retention duration.

Turning next to FIG. 2, some examples of fragmented cloud objects with expired segments are disclosed generally at 400. While the example fragmented cloud object 400 is disclosed as including a relatively small number of segments, a fragmented cloud object may contain, for example, 50-100 segments, or more. More generally, a fragmented cloud object may contain any number of segments, and the scope of the invention is not limited to the illustrative examples disclosed in the Figures. As shown, the fragmented cloud objects 400 may be of different sizes, with some of the fragmented cloud objects 400 having more, or fewer, segments than others of the fragmented cloud objects 400. Further, each of the fragmented cloud objects 400 may comprise a mix of live, that is, unexpired, segments, as well as expired segments. As well, the various segments in each of the fragmented cloud objects 400 may have different respective durations, such as 6 months, 9 months, or 1.5 years, for example. Finally, the fragmented cloud objects 400 may be locked for different respective periods of time, such as 1 year, 6 months, or 2 years, for example. The locks employed may be, for example, RLG or RLC. Following is a discussion of some example embodiments that comprise methods for the processing of fragmented cloud objects, such as the example fragmented cloud objects 400 disclosed in FIG. 2.

C.2. Aspects of Some Example Methods

In general, an object may be protected by way of various retention modes. Such retention modes, which include compliance mode and governance mode, generally apply different respective levels of protection to objects. Such modes, or locks, may be respectively referred to herein as a Retention Lock-Governance (RLG) mode, and a Retention Lock-Compliance (RLC) mode. Any of the methods disclosed herein may be performed on deduplicated blocks, segments, and/or other portions, of data. However, it is not required that any particular method be performed on deduplicated data. In some embodiments, data may be deduplicated by a deduplication application/system, and the deduplicated data then processed as disclosed herein. Such deduplication and processing may be performed by the same computing entity, or different respective computing entities.

When an object is protected by the governance mode (RLG), a user may not be able to overwrite or delete the object, or change lock settings for that object, unless the user has special permission. As such, most users may be prevented from deleting or modifying an RLG protected object, although users with special permission may be able to revert the RLG lock on the object. After the RLG lock is reverted, the object is no longer protected and may be deleted, overwritten, or modified.

When an object is protected by the compliance mode (RLC), the lock on the that RLC protected object cannot be removed and thereby the object may not be able to be overwritten or deleted by any user, even an administrator. When an object is locked in compliance mode, the retention mode of that object may not be able to be changed, and the retention period of that RLC protected object may not be able to be shortened. Protecting an object with the compliance mode may ensure that the object cannot be overwritten or deleted for the duration of the retention period.

Figure 3:
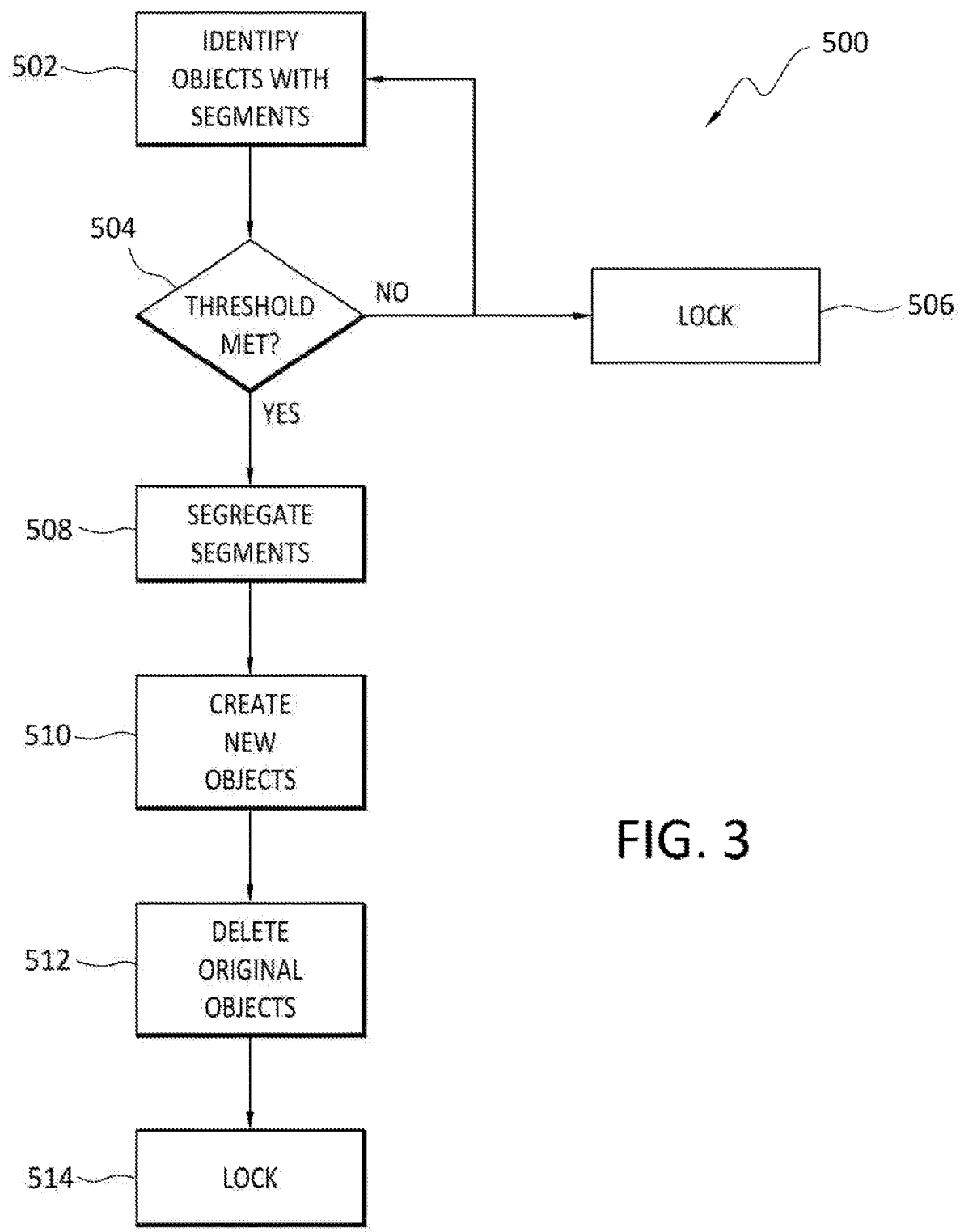
FIG. 3 discloses an example method involving RLG locks.

With reference now to FIGS. 3 and 3a, details are provided concerning an example method 500 for the processing of fragmented RLG locked cloud objects to create new defragmented and zoned objects 550 for RLG. The method 500 may begin at 502 where one or more RLG locked objects are identified as potential candidates for defragmentation. Each of the candidate RLG locked objects may then be examined to determine 504 if they include a particular number, or other quantum, of expired segments. In some embodiments, a configurable parameter may be used to define a threshold that may be used to determine 504 if an object will be defragmented or not. To illustrate, setting a threshold of 30% would mean that at least 30% of the segments in an object would have to be expired in order for that object to be considered for defragmentation. The threshold may be set at any suitable level. In general, it may be useful to set the threshold at a sufficiently high level to ensure that defragmentation of objects that meet the threshold would provide enough benefit, such as in terms of the use of processing resources required for defragmentation, and the amount of potentially reclaimable space that may result from defragmentation, to merit defragmentation of those objects.

If it is determined 504 that an object does not meet the threshold for expired segments, the method 500 may stop 506, or return to 502. On the other hand, if it is determined 504 that an object meets or exceeds the threshold for expired segments, the method 500 may proceed to 508 where the object may be processed to segregate its RL expired segments and RL active, or live, segments.

After the segments of the object have been segregated 508 into expired, and live, segments, new objects may be created 510 using the expired segments and the live segments. For example, and as shown in FIG. 3a, one or more new objects 552, which may be packed container objects, may be created 510 that only include live segments, such as RL active segments, and one or more new objects 554 may be created 510 that include only expired segments, such as RL expired segments. Because the objects 554 may only include expired segments, the objects 554 may not be locked. Thus, the segregation 508 of segments may be based at least in part on whether those segments are, or will be, locked or unlocked.

As explained in further detail below, the new objects 552 may be locked. After the new objects 552 and/or 554 have been created 510, the original object that was processed at 508 may be deleted 512.

With further reference to the segregation process 508, such segregation may be based not only on the lock status of the various segments, but also on the respective expiry times of the segments. For example, and as shown in FIG. 3a, segments of files expiring in few days, or in a week, or a month, or in 2 months, or 6 months, or 1 year, for example, may be grouped together in the same respective object. As such, the object 552 may be referred to as corresponding to a zone, or time frame, that may embrace the expiration times of all the segments in the object 552. Thus, for example, in the case of the object 552 covering a zone of 0-6 months, all the segments in that object 552 have been identified as being expected to expire in 6 months or less, as measured from a reference point in time.

In some embodiments, the reference point may be the time when the object 552 was created, although a reference point may be a time after, ore before, the time when the object 552 was created. In some embodiments, all the new objects 552 may have the same reference point in time, although that is not required, and in other embodiments, one or more of the objects 552 may have a different respective reference point in time.

The size, or duration, of a zone with which an object 552 is associated may be different depending upon various circumstances. For example, where the objects 552 will be stored in a private cloud, the duration of the zone may be relatively small, such as a few days or weeks for example. As another example, where the objects 552 will be stored in a public cloud, the duration of time zones may be relatively large, such as months or years for example.

With continued reference to FIGS. 2, 3, and 3a, the example segregation process 508 may comprise reading the segments from the fragmented cloud objects 400 and accumulating those segments in respective in-memory buffers/zones, where the buffers/zones may be designated to hold segments based on the expiry durations for active segments. In at least some embodiments, the expired segments may not be distributed in zones. Some, or all, of the RL metadata, such as max expiry_date seen, and lock_count, for example, for the accumulated active segments may be maintained throughout the segregation process 508. The in-memory buffers, once filled, may be written as new objects 552, along with the associated metadata, if any.

The new objects 552 containing active, that is, unexpired, segments, may be RLG locked 514 using cloud APIs for example, for a duration equal to the max RL expiry_time seen among all the segments in it. To illustrate, the segment in the object 552 with the longest lock time is segment E2, which has a lock time of 5 months. Thus, the object 552 may be RLG locked for 5 months. As noted, new objects 554 that contain only expired segments may not need any further action after being created 510, and those objects 554 may now be picked up by regular GC processes for liveness checks, and may possibly be deleted so that the space those objects 554 occupied may be reclaimed.

Figure 4A:
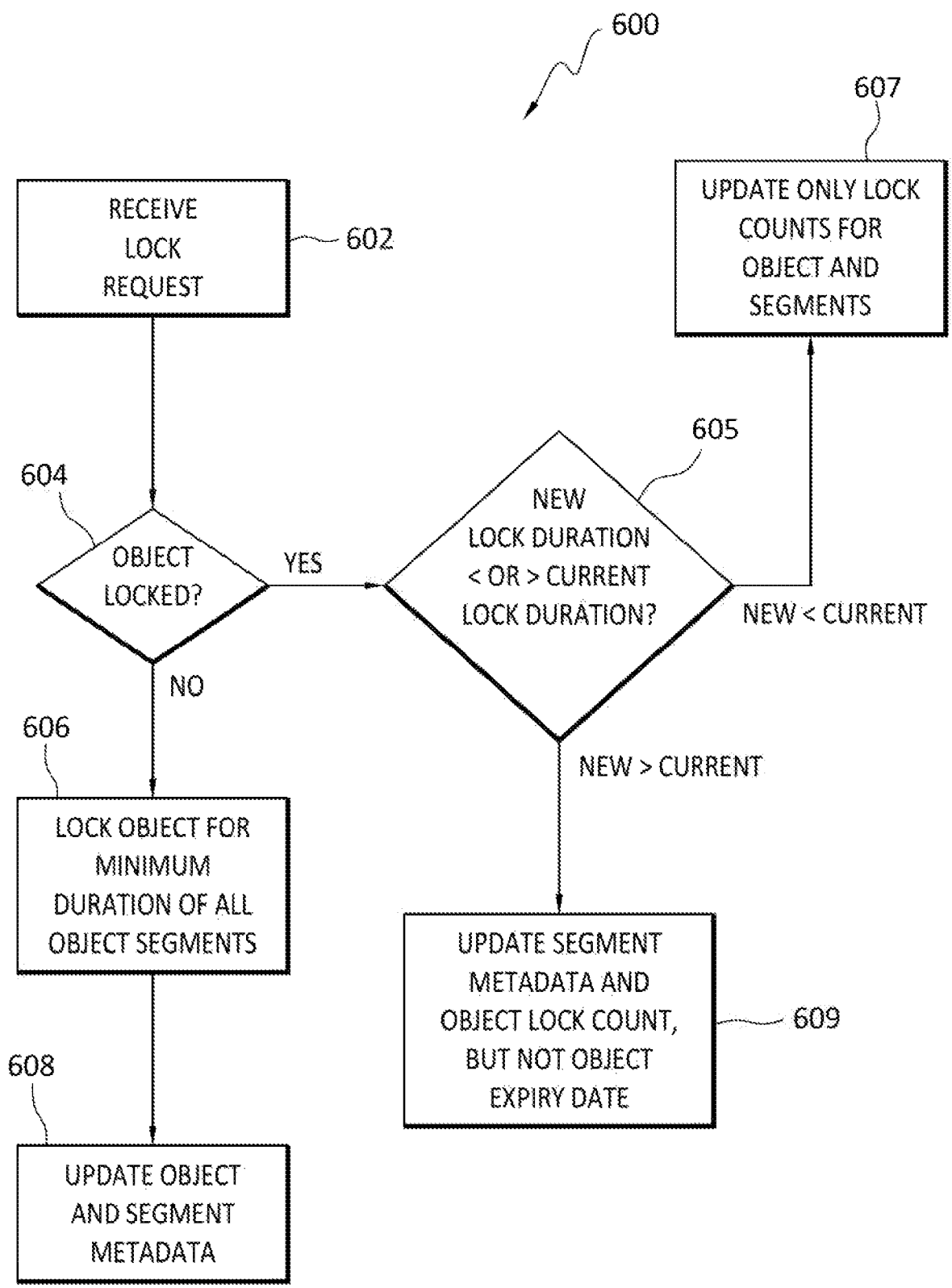
FIG. 4a discloses an example method involving RLC locks.
Figure 4B:
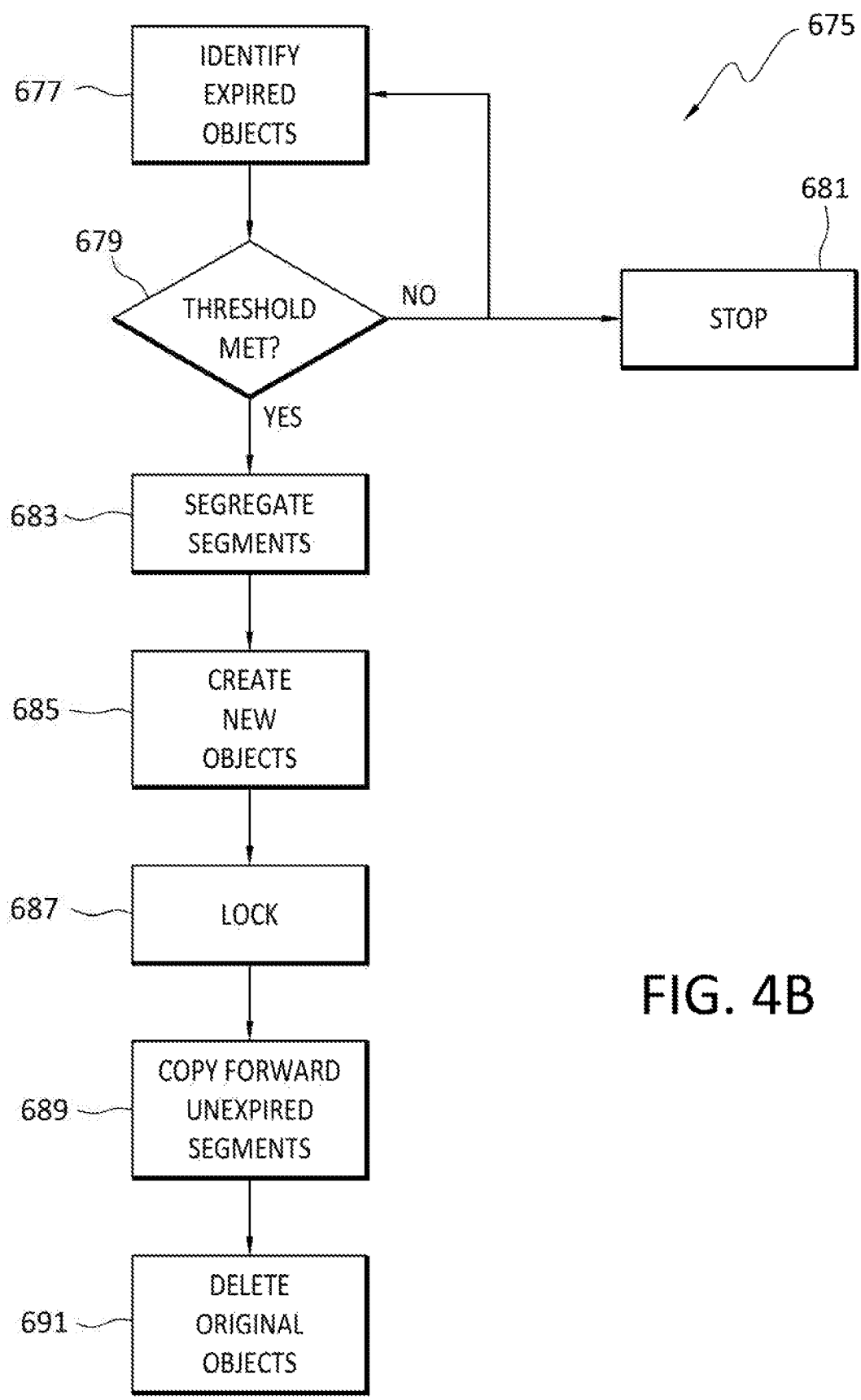
FIG. 4b discloses an example garbage collection method.
Figure 4C:
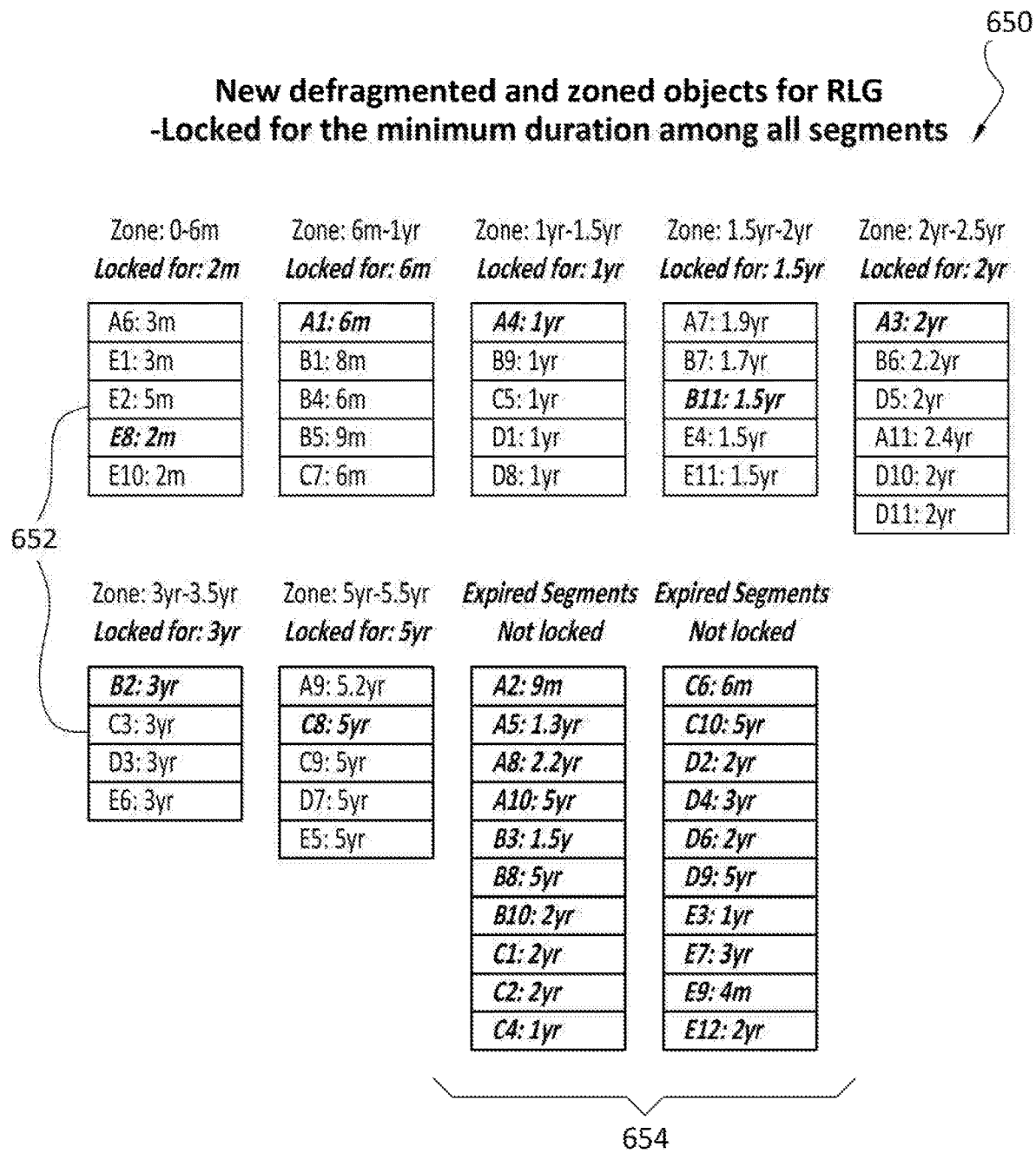
FIG. 4c discloses an example segment distribution across newly created objects after the defrag process and their RLC lock durations.

Turning next to FIGS. 4a, 4b and 4c, and with continuing reference to FIG. 2, details are provided concerning an example method 600 for RLC locking of cloud objects, where such objects are generally denoted at 650 in FIG. 4c. Except as noted herein, the method 600 may be similar, or identical, to the method 500, and the objects 650 may be similar, or identical, to the objects 550.

With particular attention to FIG. 4a, the method 600 may begin when a new compliance lock request is received 602, such as by a controlled locking mechanism for example, for an RLC object. After the lock request is received 602, a determination 604 is made as to whether or not the object is already locked. If it is determined 604 that the object is not already locked, the method 600 may proceed to 606 where the object is locked for a minimum duration of all segments of the object. The object metadata and segment metadata may then be updated 608.

On the other hand, if it is determined at 604 that the object concerning which the lock request was received 602 is already locked, then a further determination may be made 605 as to whether the new lock duration specified in the lock request is greater than, or less than, a current lock duration of the object. If it is determined 605 that the new lock duration is lesser than the current lock duration, then the method 600 may proceed to 607 where only lock counts for the object and its segments are updated.

If the new lock duration is determined 605 to be greater than the current lock duration of the object, then the method may proceed to 609. At 609, segment metadata, such as lock count and expiry date, and the object lock count are updated, but the object expiry date is not updated.

With reference next to FIG. 4b, details are provided concerning an example method 675 for handling RLC expired objects. The method 675 may begin at 677 where one or more expired objects are identified. Next, a threshold determination 679 is made, which may be similar or identical to the determination 504 in the method 500. If the threshold is determined to not be met, the method may advance to 681. If the threshold is determined 679 to be met, the method may advance to 683 where segments of the RLC expired objects are segregated.

Segregation 683 may comprise performing one or more garbage collection runs through any RLC expired objects. For each RLC expired object, the method 675 may follow the same grouping based segregation mechanism, as in the example method 500 for RLG objects. That is, in the segregation process 683, the non-expired segments of the object may be read out and accumulated in different in-memory buffers, each of which is designated to hold segments of particular expiry durations, such as 6 months, 1 year, 1.5 year, 2 years, for example. Any expired segments may be placed into another buffer.

As shown in FIG. 4c, the in-memory buffers may then be written 685 to new container objects, examples of which are denoted at 652, such that each object may contain segments with related expiry durations. For example, one of the objects 652 has a zone of 0-6 months, which means that every segment in the object 652 will expire no more than 6 months after a particular reference time. In this particular example, it can be seen that the segment of longest duration, segment E2, is set to expire in 5 months. All such objects may then be RLC locked 687, using cloud provider APIs for example, for the minimum expiry duration, seen among all the segments that make up the object. To illustrate, and with reference again to the object 652 with the zone of 0-6 months, the minimum duration of any segment in that object 652 is 2 months, specified by segments E8 and E10. Thus, the lock time for that object 652 may be set at 2 months. The process 685 may also comprise creation of new objects 654 whose segments have all expired. The new objects 654 may not be subjected to locking.

A new object 652, such as the object 652 whose zone is 6-12 months for example, may contain various segments with different respective durations. In this particular example, segments A1 and B4 (see also, FIG. 2) have the minimum duration of all segments in that new object 652. As such, RLC may be held on that object 652 for the minimum duration, that is, 6 months.

With regard to segment expiration, suppose that an object, such as a new object 652 for example, contains segments of respective durations 6 months, 1 year, and 2 years, and RLC will be held for the minimum time dictated by these segments, namely, 6 months. At some point before this object expires, such as one day prior to the end of the 6 month period for example, the remaining segments with respective durations of 1 year and 2 years may be copy forwarded 689 and locked for 1 year, that is, the shortest period of time dictated by the two remaining segments. This process may enable the old object, that is the object that included the 6 month, 1 year, and 2 year, segments, to be deleted 691, thereby saving space, and decreasing the TCO. Absent the copy forward process 689, even if the object had a single segment with a 2 year duration, the object would have been locked for 2 years.

With continued reference to FIGS. 4, 4a, and 4b, any new objects 654 containing only expired segments may not require any further processing after their creation 685, and those objects 654 may now be picked up by regular GC processes for liveness checks, and may possibly be deleted so that the space that those objects 654 occupied may be reclaimed. As well, the original fragmented object, such as one of the objects 400, which was the basis for creation 685 of one or more objects 652 and/or 654, may be deleted 691 and its space reclaimed, possibly immediately.

It is noted that while the method 675 may be applied specifically to RLC objects, the same, or a similar, method may be applied, for example, by a dedupe system, to RLG objects as well. In some embodiments, the methods 500, 600, and 675, including the segregation processes 508 and 683, respectively, may maintain their own state data to ensure that those methods and processes may be paused, resumed, or recovered, in the event of abrupt termination or other conditions.

In some embodiments, the methods 500, 600, 675, and/or any portions thereof, may be executed without actually creating any new objects. That is, at least processes 510 and 608 may be omitted. These modified methods may be referred to as operating in, and/or defining, an analytical mode, and may be performed to prospectively analyze possible space reclamation benefits, and/or, an estimate of the total I/O (Input/Output operations) that may be performed when the full methods 500 and/or 600 are actually run, and new objects created 510/608.

In the analytical mode, and in contrast with the methods 500, 600, and 675, no in-memory buffers need be created, no segment copies need be made, no real objects need be created, nor any I/O be performed. Rather, in one implementation, the analytical mode may maintain only appropriate accounting for all the phases of the method, and may provide a report after the method has completed.

It is noted with respect to the example methods disclosed herein, including methods 500, 600, and 675, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Figure 5:
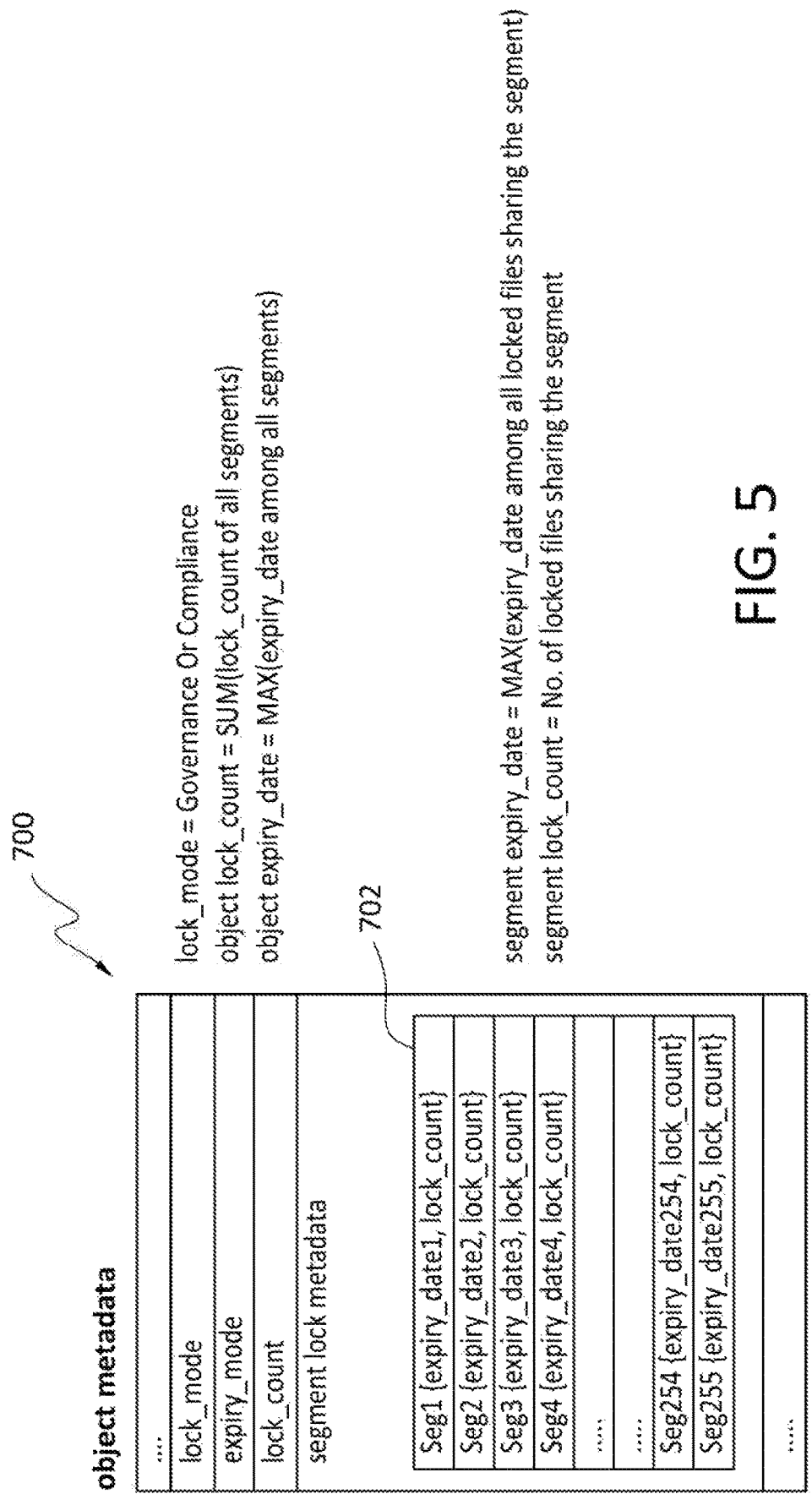
FIG. 5 discloses example retention lock information in object and segment metadata (uploaded).

With reference next to FIG. 5, it was noted earlier that object and/or segment metadata, such as object metadata 700, may be updated in connection with performance of the various methods and processes disclosed herein. As shown in the example of FIG. 5, the object metadata 700 may comprise metadata applicable to the object as a whole such as, but not limited to, lock_mode, expiry_date, and lock_count. As well, individual segments of an object may have respective associated segment-specific metadata. For example, the segment metadata 702 may comprise, for each of one or more segments, a segment expiry_date, and a segment lock_count, for example. Any of the segment and object metadata may be updated in connection with performance of the methods and processes disclosed herein. As noted herein, expiry dates may be updated for example. As another example, if a file is deleted or added, a lock count of an object and/or segment may be updated, by decrementing or incrementing, respectively, to reflect that the object or segment is no longer shared by that file, or is shared by the new file.

D. FURTHER ASPECTS OF SOME EXAMPLE EMBODIMENTS

As disclosed herein, embodiments of the invention embrace, among other things, defragmentation processes that may be performed with objects and their constituent segments. Some of such processes, and/or other processes disclosed herein, may possess various characteristics. By way of illustration, example embodiments may operate on an object that has a variable size, such as a block with a variable size. As another example, some embodiments may reduce cloud storage costs by moving segments that have live and expired retention periods into different respective objects so that the whole expired object can be expired at once and the space occupied by the expired object reclaimed. This aspect may be especially useful when applied to existing files where a user, such as an app admin, may change object and/or segment retention times at will. As well, in some embodiments, a file or other object may be locked any time after it was created, and not necessarily at the time of creation. Thus, objects and/or segments may not be grouped as per retention duration values that existed at the time of creation. Moreover, example embodiments may enable segment-by-segment analysis and processing, such as retention or deletion, on a segment basis. In contrast, conventional systems and methods are unable to delete only selected portions, such as expired segments, of an object. As well, embodiments may be operable in connection with both locking modes, that is, governance and compliance, in operating environments such as cloud environments. Further, embodiments may enable achievement of a significant benefit in the form of TCO reduction by locking an object for a minimum amount of time, in the case of RLC object locking, and then defragging the object just before expiration and reapplying retention to the resulting new objects based on next minimum retention based on the segments in the object. Further, while conventional approaches and dedupe applications providers may provide some limited object retention capabilities on the on-premises side, such approaches and dedupe applications fail to provide retention capabilities on the cloud provider side, much less provide any of the disclosed retention capabilities. Thus, in these conventional approaches, the data is vulnerable to deletion from the cloud provider side.

Finally, the following are examples of various particular embodiments. In one example of such an embodiment, a method may detect fragmented cloud objects and segregate the segments of those objects into separate defragmented objects based on various factors such as the lock status of those segments, expiry duration, and lock mode for example, to eventually aid GC to be able to reclaim cloud space utilized by expired segments. In another such example embodiment, a method may implement controlled RLC (compliance) locking for cloud objects so that compliance locks expire early and thereby allow the defragmentation method to process and segregate the objects containing expired segments. In a further such example embodiment, a method, which may be configured to focus on TCO reduction for example, may implement the segregation of the RL active and RL expired segments while ensuring data integrity remains intact at segment level. In a final such example embodiment, a method may analyze the fragmentation level in an environment, such as a cloud environment, that is due to expired segments and provide an estimated report of the possible benefits and possible I/O cost with the method should it actually be run.

E. FURTHER EXAMPLE EMBODIMENTS

Following are some further example embodiments of the invention. These are presented only by way of example and are not intended to limit the scope of the invention in any way.

Embodiment 1. A method, comprising: identifying a cloud object as a potential candidate for defragmentation; evaluating the cloud object to determine what portion of segments of the cloud object are expired; when the portion of expired segments meets or exceeds a threshold, segregating the expired segments and unexpired segments of the cloud object; creating a first new cloud object that includes only unexpired segments; creating a second new cloud object that includes only expired segments; and deleting the cloud object from storage.

Embodiment 2. The method as recited in embodiment 1, wherein the cloud object is a deduplicated object.

Embodiment 3. The method as recited in any of embodiments 1-2, wherein the first new object is locked, and the second new cloud object is not locked.

Embodiment 4. The method as recited in any of embodiments 1-3, wherein the first new cloud object is zoned so that all segments of the first new cloud object have respective expiration times that fall within a specified time frame.

Embodiment 5. The method as recited in any of embodiments 1-4, wherein the first new cloud object includes a plurality of segments, each of the segments having a respective expiration duration, and the first new cloud object is RLG locked for a time period corresponding to the expiration duration that is longest among the segments.

Embodiment 6. The method as recited in any of embodiments 1-5, wherein the first new cloud object includes a plurality of segments, each of the segments having a respective expiration duration, and the first new cloud object is RLC locked for a time period corresponding to the expiration duration that is shortest among the segments.

Embodiment 7. The method as recited in embodiment 6, wherein the first new cloud object expires at an end of the time period corresponding to the shortest expiration duration and, prior to expiration of the first new cloud object, and the method further comprises: copying forward all segments whose respective expiration duration is longer than the shortest expiration duration; using the copy forwarded segments to create a second new cloud object; and deleting the first new cloud object from storage.

Embodiment 8. The method as recited in any of embodiments 1-7, further comprising performing a liveness check, and deleting the second new cloud object based on results of the liveness check.

Embodiment 9. The method as recited in any of embodiments 1-8, wherein segregating the expired segments and unexpired segments comprises copying the unexpired segments into a first in-memory buffer, and copying the expired segments into a second in-memory buffer.

Embodiment 10. The method as recited in any of embodiments 1-9, further comprising: receiving a lock request concerning the cloud object; determining whether the cloud object is locked or not locked; when the cloud object is determined to not be locked, locking the cloud object according to a duration of a segment of the cloud object that has a shortest duration of all segments of the cloud object, and updating metadata of the cloud object and metadata of the segments; and when the cloud object is determined to be locked, determining whether a new lock duration specified in the lock request is more or less than a current lock duration of the cloud object and, either: when the new lock duration is greater than the current lock duration, updating metadata of the segments (lock count and expiry date) and updating a lock count of the object, but not updating an expiry date of the object; or when the new lock duration is less than the current lock duration, updating only lock counts for the object and for the segments.

Embodiment 11. A method, comprising: receiving a lock request concerning the cloud object; determining whether the cloud object is locked or not locked; when the cloud object is determined to not be locked, locking the cloud object according to a duration of a segment of the cloud object that has a shortest duration of all segments of the cloud object, and updating metadata of the cloud object and metadata of the segments; and when the cloud object is determined to be locked, determining whether a new lock duration specified in the lock request is more or less than a current lock duration of the cloud object and, either: when the new lock duration is greater than the current lock duration, updating metadata (lock count and expiry date) of the segments and updating a lock count of the object, but not updating an expiry date of the object; or when the new lock duration is less than the current lock duration, updating only lock counts for the object and for the segments.

Embodiment 12. A method for performing any of the operations, methods, or processes, or any portion of any of these, disclosed herein.

Embodiment 13. A non-transitory storage medium having stored therein instructions that are executable by one or more hardware processors to perform operations comprising the operations of any one or more of embodiments 1 through 12.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
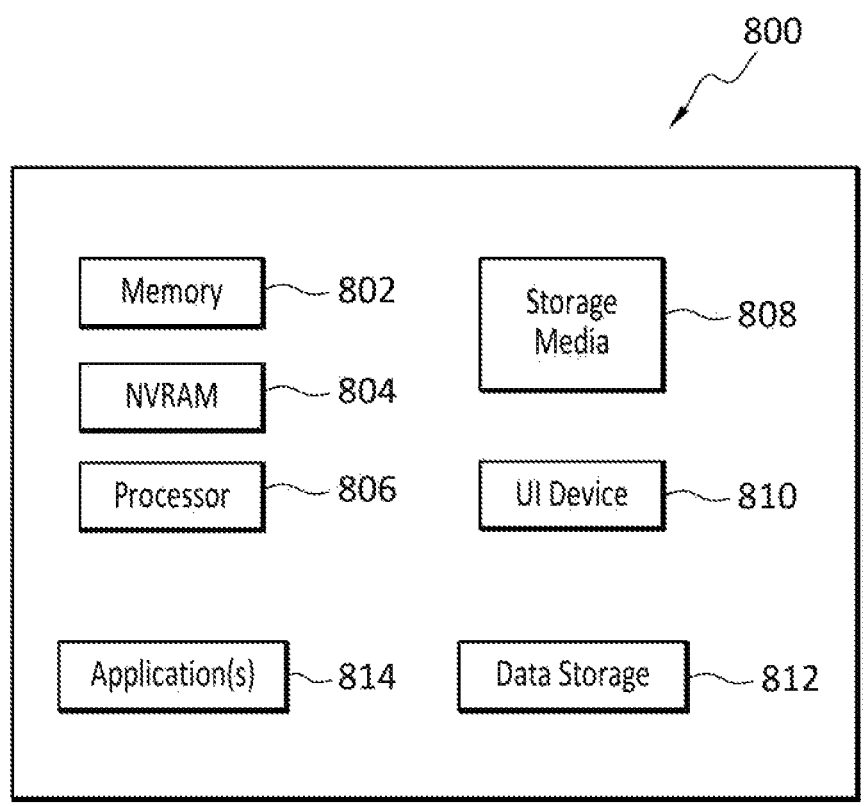
FIG. 6 discloses aspects of an example computing entity.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 6.

In the example of FIG. 6, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying a cloud object as a potential candidate for defragmentation in a cloud storage;
   evaluating the cloud object to determine what portion of segments of the cloud object are expired; and
   when the portion of expired segments meets or exceeds a threshold:
      segregating the expired segments and unexpired segments of the cloud object;
      creating in the cloud storage a plurality of first new cloud objects, which include only unexpired segments, based on expiry times of the unexpired segments;
      creating in the cloud storage a second new cloud object that includes only expired segments, which have not been deleted; and
      deleting the cloud object from the cloud storage,
   wherein each of the plurality of first new cloud objects is locked during a respective retention duration, which is based on expiration durations of segments included in each first new cloud object.

2. The method as recited in claim 1, wherein the cloud object is a deduplicated object.

3. The method as recited in claim 1, wherein the plurality of first new cloud objects are locked, and the second new cloud object is not locked.

4. The method as recited in claim 1, wherein the plurality of first new cloud objects are zoned so that all segments of the plurality of first new cloud objects have respective expiration times that have not yet come and fall within a specified time frame.

5. The method as recited in claim 1, wherein the respective retention duration is a longest expiration duration among segments saved in a respective first new cloud object.

6. The method as recited in claim 1, wherein the respective retention duration is a shortest expiration duration among segments saved in a respective first new cloud object.

7. The method as recited in claim 6, wherein the plurality of first new cloud objects will expire at an end of the shortest expiration duration that has not yet come and prior to expiration of one of the plurality of first new cloud objects, the method further comprises:
copying forward all segments whose respective expiration duration is longer than the shortest expiration duration;
using the copy forwarded segments to create a second new cloud object; and
deleting the plurality of first new cloud objects from the cloud storage.

8. The method as recited in claim 1, further comprising performing a liveness check, and deleting the second new cloud object based on results of the liveness check.

9. The method as recited in claim 1, wherein segregating the expired segments and unexpired segments comprises copying the unexpired segments into a first in-memory buffer, and copying the expired segments into a second in-memory buffer.

10. The method as recited in claim 1, further comprising:
receiving a lock request concerning the cloud object;
determining whether the cloud object is locked or not locked;
when the cloud object is determined to not be locked, locking the cloud object according to a duration of a segment of the cloud object that has a shortest duration of all segments of the cloud object, and updating metadata of the cloud object and metadata of the segments; and
when the cloud object is determined to be locked, determining whether a new lock duration specified in the lock request is more or less than a current lock duration of the cloud object and, either:
when the new lock duration is greater than the current lock duration, updating metadata of the segments and updating a lock count of the cloud object, but not updating an expiry date of the cloud object; or
when the new lock duration is less than the current lock duration, updating only lock counts for the cloud object and for the segments.

11. A non-transitory storage medium having stored therein instructions that are executable by one or more hardware processors to perform operations comprising:
identifying a cloud object as a potential candidate for defragmentation in a cloud storage;
evaluating the cloud object to determine what portion of segments of the cloud object are expired; and
when the portion of expired segments meets or exceeds a threshold:
segregating the expired segments and unexpired segments of the cloud object;
creating in the cloud storage a plurality of first new cloud objects, which include only unexpired segments, based on expiry times of the unexpired segments;
creating in the cloud storage a second new cloud object that includes only expired segments, which have not been deleted; and
deleting the cloud object from the cloud storage,
wherein each of the plurality of first new cloud objects is locked during a respective retention duration, which is based on expiration durations of segments included in each first new cloud object.

12. The non-transitory storage medium as recited in claim 11, wherein the cloud object is a deduplicated object.

13. The non-transitory storage medium as recited in claim 11, wherein the plurality of first new cloud objects are locked, and the second new cloud object is not locked.

14. The non-transitory storage medium as recited in claim 11, wherein the plurality of first new cloud objects are zoned so that all segments of the first new cloud object have respective expiration times that have not yet come and fall within a specified time frame.

15. The non-transitory storage medium as recited in claim 11, wherein the respective retention duration is a longest expiration duration among segments included in a respective first new cloud object.

16. The non-transitory storage medium as recited in claim 11, wherein the respective retention duration is a shortest expiration duration among segments included in a respective first new cloud object.

17. The non-transitory storage medium as recited in claim 16, wherein the plurality of first new cloud objects will expire at an end of the shortest expiration duration that has not yet come, and, prior to expiration of one of the plurality of first new cloud objects, and the operations further comprise:
copying forward all segments whose respective expiration duration is longer than the shortest expiration duration;
using the copy forwarded segments to create a second new cloud object; and
deleting the plurality of first new cloud objects from the cloud storage.

18. The non-transitory storage medium as recited in claim 11, wherein the operations further comprise performing a liveness check, and deleting the second new cloud object based on results of the liveness check.

19. The non-transitory storage medium as recited in claim 11, wherein segregating the expired segments and unexpired segments comprises copying the unexpired segments into a first in-memory buffer, and copying the expired segments into a second in-memory buffer.

20. The non-transitory storage medium as recited in claim 11, wherein the operations further comprise:
receiving a lock request concerning the cloud object;
determining whether the cloud object is locked or not locked;
when the cloud object is determined to not be locked, locking the cloud object according to a duration of a segment of the cloud object that has a shortest duration of all segments of the cloud object, and updating metadata of the cloud object and metadata of the segments; and
when the cloud object is determined to be locked, determining whether a new lock duration specified in the lock request is more or less than a current lock duration of the cloud object and, either:

when the new lock duration is greater than the current lock duration, updating metadata of the segments and updating a lock count of the cloud object, but not updating an expiry date of the cloud object; or when the new lock duration is less than the current lock duration, updating only lock counts for the cloud object and for the segments.

\* \* \* \* \*